United States Patent
Tada

[11] Patent Number: 5,842,943
[45] Date of Patent: Dec. 1, 1998

[54] HYDRAULIC TENSIONER HAVING AN OIL RESERVOIR SPONGE MEMBER

[75] Inventor: Naosumi Tada, Nabari, Japan

[73] Assignee: Borg-Warner Automotive, K.K., Mie Prefecture, Japan

[21] Appl. No.: 852,536

[22] Filed: May 7, 1997

[30] Foreign Application Priority Data

May 10, 1996 [JP] Japan .................................. 8-140652

[51] Int. Cl.$^6$ ...................................................... F16H 7/08
[52] U.S. Cl. ............................ 474/109; 474/110; 474/111
[58] Field of Search .................................. 474/109, 111, 474/110, 133, 134, 135, 137, 138

[56] References Cited

U.S. PATENT DOCUMENTS

| | | | |
|---|---|---|---|
| 4,790,801 | 12/1988 | Schmidt et al. | 474/110 |
| 4,902,266 | 2/1990 | Ojima et al. | 474/111 |
| 4,909,777 | 3/1990 | Inoue et al. | 474/110 |
| 5,006,095 | 4/1991 | Suzuki | 474/111 |
| 5,073,150 | 12/1991 | Shimaya | 474/110 |
| 5,277,664 | 1/1994 | Mott | 474/110 |
| 5,366,415 | 11/1994 | Church et al. | 474/110 |
| 5,569,105 | 10/1996 | Sakai et al. | 474/133 X |
| 5,601,505 | 2/1997 | Tada | 474/110 |
| 5,653,653 | 8/1997 | Ledvina | 474/110 |
| 5,658,212 | 8/1997 | Meurer et al. | 474/110 |

FOREIGN PATENT DOCUMENTS 6-45141  6/1994  Japan .
HEI 7-47631  11/1995  Japan .

Primary Examiner—Richard M. Lorence
Assistant Examiner—Marcus Charles
Attorney, Agent, or Firm—Sidley & Austin; Greg Dziegielewski

[57] ABSTRACT

A hydraulic tensioner having an oil reservoir sponge member present in the bore of the housing is provided. When the sponge member is compressed, the oil retained or absorbed by the sponge member discharges from the sponge member and enters the oil passage of the piston.

8 Claims, 2 Drawing Sheets

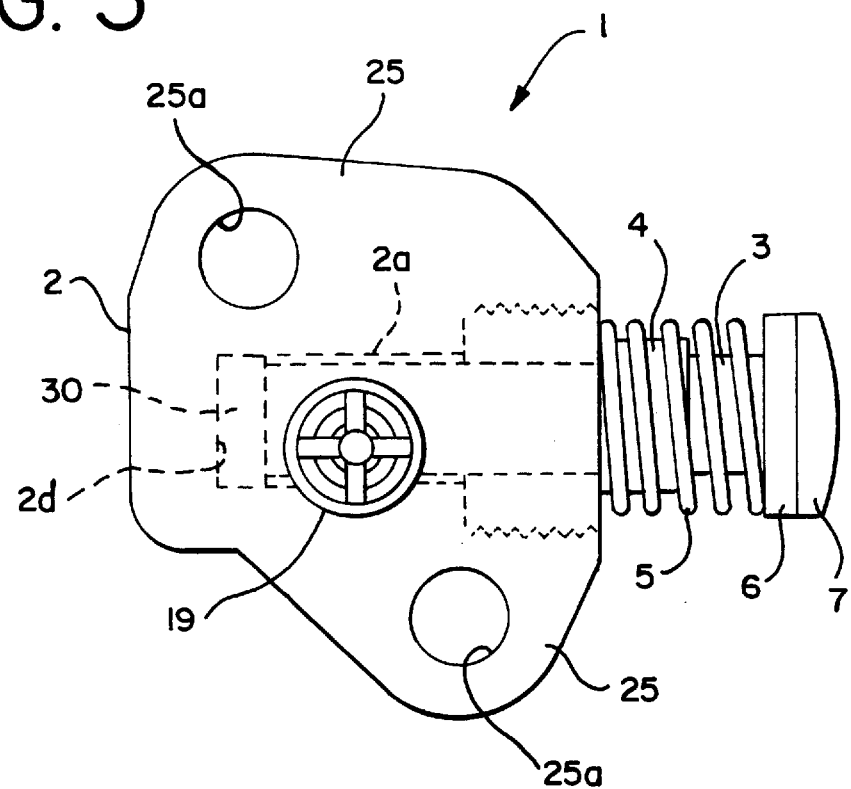
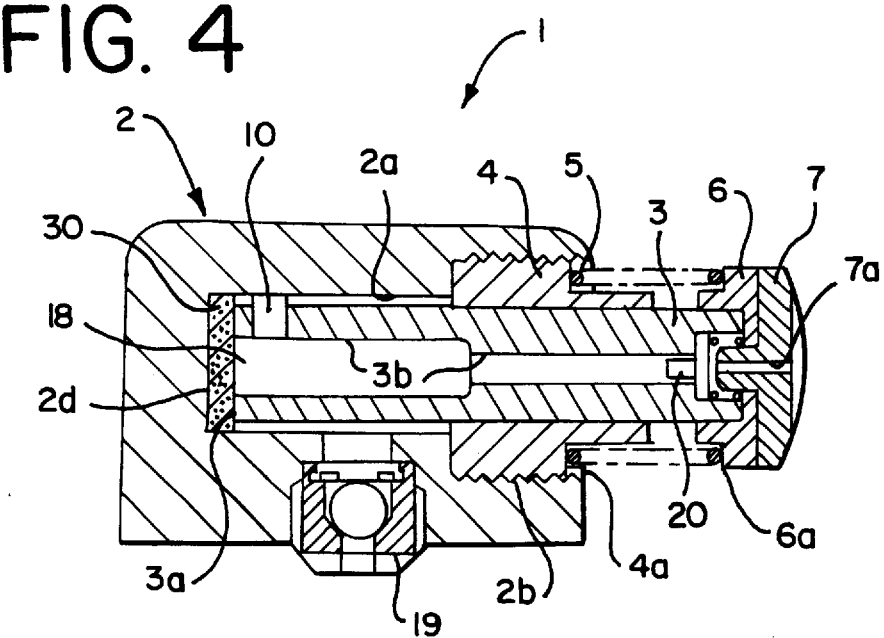

HYDRAULIC TENSIONER HAVING AN OIL RESERVOIR SPONGE MEMBER

This invention relates to a hydraulic tensioner for a power transmission device. More specifically, this invention relates to a hydraulic tensioner having a housing with a bore, a piston slidably received within the bore to form a fluid chamber, an oil passage within the piston that connects to the fluid chamber, and an oil reservoir sponge member in the bore.

BACKGROUND OF THE INVENTION

A tensioning device, such as a hydraulic tensioner, is used to impart and maintain a certain degree of tension in the chain or belt that drives, for example, an engine camshaft. A hydraulic tensioner typically comprises a housing having a bore, and a piston having a rear end which is inserted into the bore of the housing. The fluid chamber connects to an oil passage present in the piston. The piston is biased in a protruding or outward direction by a spring. A fluid chamber is formed by the inner wall surface of the bore and the rear end face of the piston. A fluid pressure source provides pressurized fluid through a passage in the housing to the fluid chamber.

After engine start-up, fluid from the fluid pressure source does not immediately supply the fluid chamber or oil passages with a sufficient amount of oil. Thus, the oil pressure acting on the piston is initially low, and requires time to reach a normal level.

Various hydraulic tensioners have been proposed to provide an oil reservoir. For example, a hydraulic tensioner having an oil reservoir formed in the housing to supply oil to the fluid chamber and oil passages is disclosed in Japanese Laid-Open Patent Utility Model Heisei 6-45141. Another hydraulic tensioner having an oil reservoir formed within an engine side attachment wall is disclosed in Japanese Laid-Open Patent Utility Model Heisei 7-47631. However, since these hydraulic tensioners require that the housing be enlarged to accommodate the oil reservoir, additional space and processing cost are required.

The present invention is directed to the above-described problems in conventional hydraulic tensioners, and offers a hydraulic tensioner which further reduces processing costs and conserves housing space.

SUMMARY OF THE INVENTION

The present invention is directed to a hydraulic tensioner having a housing with a bore, a piston slidably received within the bore to form a fluid chamber, an oil passage within the piston that connects to the fluid chamber, and an oil reservoir sponge member in the bore.

A first embodiment of the hydraulic tensioner of the present invention provides a hydraulic tensioner having a housing that includes a bore and an external attachment surface. The bore has a bottom face surface. A piston having a rear end face is slidably received in the bore, and a fluid chamber is formed between the piston and the bore. The piston has an oil passage that is connected to the fluid chamber. A spring biases the piston in a protruding direction from the bore. A passage connects the fluid chamber with a source of fluid. A sponge member is provided which is present in the bore of the housing.

In a second embodiment, a hydraulic tensioner according to the first embodiment is provided wherein the sponge member is located in the fluid chamber.

In a third embodiment, a hydraulic tensioner according to the second embodiment is provided wherein the sponge member contacts the bottom face of the bore and the rear end face of the piston.

In a fourth embodiment, a hydraulic tensioner according to the first embodiment is provided wherein the sponge member comprises a naturally-occurring material.

In a fifth embodiment, a hydraulic tensioner according to the first embodiment is provided wherein the sponge member comprises a synthetic material.

In a sixth embodiment, a hydraulic tensioner according to the first embodiment is provided wherein the sponge member retains oil.

In a seventh embodiment, a hydraulic tensioner according to the sixth embodiment is provided wherein retraction of the piston causes the sponge member to discharge oil into the oil passage of the piston.

In an eighth embodiment, a hydraulic tensioner according to the first embodiment is provided wherein the oil passage extends axially within the piston from the rear end face of the piston to an opening at the other end of the piston.

In a ninth embodiment, a hydraulic tensioner according to the eighth embodiment is provided wherein the oil passage has a relief valve that opens and closes to permit the flow of oil through the oil passage.

For a better understanding of these and other embodiments of the invention, reference should be made to the following detailed description taken in conjunction with the accompanying drawings.

BRIEF DESCRIPTION OF THE DRAWINGS

FIG. 3 is a rear plan view of an embodiment of the present invention illustrating the bore in phantom.

FIG. 4 is a front cross-sectional view that illustrates the operation of an embodiment of the hydraulic tensioner of the present invention with the piston retracted.

DETAILED DESCRIPTION OF THE PREFERRED EMBODIMENTS

Turning now to the drawings, FIGS. 1–4 depict various embodiments of this hydraulic tensioner invention having an oil reservoir sponge member.

Figure 1:
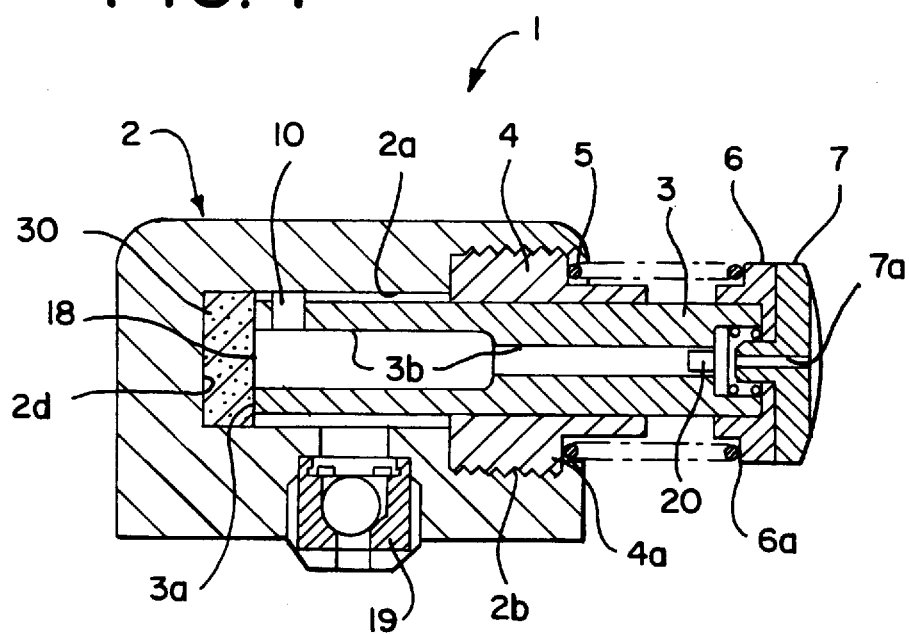
FIG. 1 is a front cross-sectional view of an embodiment of the present invention.

FIG. 1 illustrates one embodiment of the present invention. A hydraulic tensioner 1 has a housing 2 with a bore 2a that opens at one end. A piston 3 has a rear end which is inserted into the bore 2a. A support 4 slidably supports the piston 3, and threadedly engages with female thread 2b formed in the opening of bore 2a. A spring 5 biases the piston 3 in the protruding or outward direction. One end of the spring 5 pressure contacts the end face 4a of the support 4. A second end of the spring 5 pressure contacts the end face 6a of a cap 6 that is fixed to the tip of the piston. The cap 6 has a contact part 7 which contacts a tensioner arm (not shown). A pin 10 that protrudes from the outer periphery of piston 3 is attached to the rear end of the piston.

A sponge member 30 is present in the bore 2a of the housing 2, between the bottom face 2d of the bore and the rear end face 3a of the piston 3. The sponge member may contact the bore as well as the piston. The sponge member 30 may comprise any naturally occurring or synthetic material. The sponge member 30 is capable of retaining or absorbing oil present in the bore of the housing. As further discussed below, the oil retained by or absorbed by the sponge member 30 can be released or discharged from the sponge member 30 upon retraction of the piston.

A fluid chamber 18 is formed in the housing 2 by the inner wall surface of the bore 2a and the rear end face 3a of the piston. Fluid pressure from a fluid pressure source is supplied to the fluid chamber 18 through a check valve 19 located at the bottom of the housing 2. The fluid pressure source may be a reservoir, oil pump, or the like.

An oil passage 3b extends axially along the piston 3 and is connected to the fluid chamber 18. A relief valve 20 opens and closes the oil passage 3b, and is located at the opening on the front end of the oil passage 3b. Also, an oil passage 7a is formed in a contact part 7, and it opens on the front and rear end faces of the contact part 7.

Figure 2:
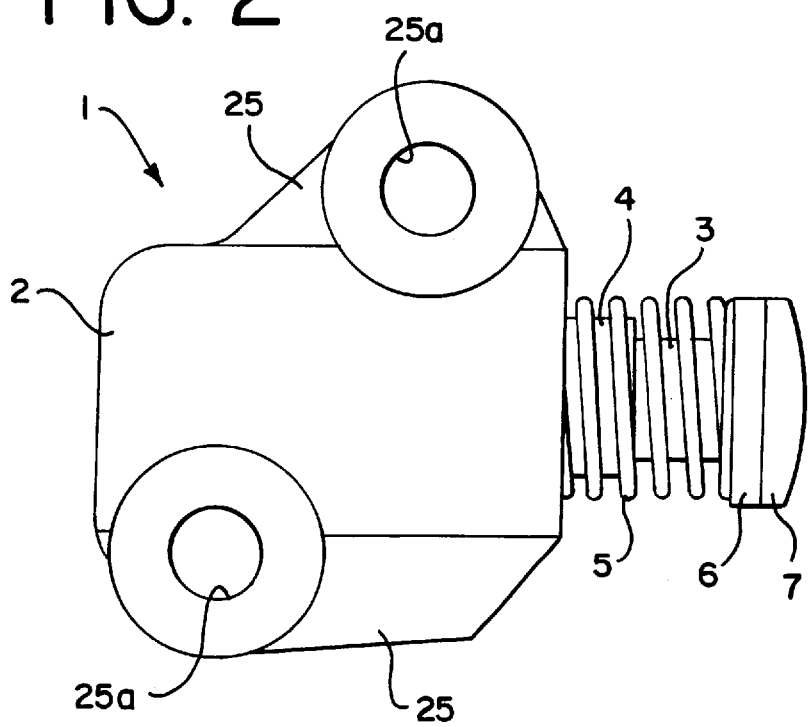
FIG. 2 is a front plan view of an embodiment of the present invention.

Also, an attachment aperture 25a is provided to the side portion 25 of the housing 2 to attach the hydraulic tensioner 1 to the engine side, as shown in FIGS. 2 and 3.

During engine start-up, the chain has a tendency to flutter. A pushing-down force is generated immediately after the start of rotation of the camsprocket, and acts on contact part 7 at the tip of the piston. Thus, the piston 3 retracts against the force of the spring 5.

As shown in FIG. 4, when the sponge member 30 is compressed between the rear end face 3a of the piston and the bottom face 2d of the bore, the oil retained in or absorbed by the sponge member 30 is immediately available in the fluid chamber 18, and may discharge from the sponge member into the oil passage 3b. Thus, for example, the sponge member 30 can provide oil to the fluid chamber 18 and oil passage 3b immediately after engine start-up, even before fluid from a fluid pressure source can reach the oil passage. In this manner, fluttering of the chain immediately after engine start-up is further suppressed.

When the piston 3 retracts and the fluid pressure reaches a predetermined maximum pressure, the oil in the fluid chamber 18 discharges to the outside through oil passages 3b and 7a, via the relief valve 20 at the tip of the contact part 7. Thus, a pressure relief mechanism limits the accumulation of high pressure in the fluid chamber 18. Since the oil passages 3b and 7a are provided within the piston 3 and contact part 7, and the relief valve 20 is provided within oil passage 3b, housing space is conserved.

Moreover, a separate oil reservoir in the housing 2 is unnecessary, as the sponge member 30 retains or absorbs oil and thus can function as an oil reservoir within the fluid chamber. Thus, processing costs are reduced and housing space is further conserved. Also, when the piston retracts, the sponge member 30 prevents or cushions the contact of the rear end face 3a of the piston with the bottom face 2d of the bore, reducing the noise due to such a direct contact.

Those skilled in the art to which the invention pertains may make modifications and other embodiments employing the principles of this invention without departing from its spirit or essential characteristics particularly upon considering the foregoing teachings. The described embodiments are to be considered in all respects only as illustrative and not restrictive and the scope of the invention is, therefore, indicated by the appended claims rather than by the foregoing description Consequently, while the invention has been described with reference to particular embodiments, modifications of structure, sequence, materials and the like would be apparent to those skilled in the art, yet still fall within the scope of the invention.

What is claimed is:

1. A hydraulic tensioner comprising:

a housing having a bore;

said bore having a bottom face;

a piston slidably received in said bore, said piston and said bore forming a fluid chamber therebetween;

said piston having a rear end face and an oil passage connected to the fluid chamber;

a spring biasing said piston in a protruding direction from said bore;

a passage in said housing to connect the fluid chamber with a source of fluid; and a sponge member in said bore, said sponge member contacting said bottom face of said bore.

2. The hydraulic tensioner according to claim 1, wherein said sponge member is located in said fluid chamber.

3. The hydraulic tensioner according to claim 2, wherein said sponge member contacts said bottom face of said bore and said rear end face of said piston.

4. The hydraulic tensioner according to claim 1, wherein said sponge member comprises a naturally-occurring material.

5. The hydraulic tensioner according to claim 1, wherein said sponge member comprises a synthetic material.

6. A hydraulic tensioner comprising:

a housing having a bore;

said bore having a bottom face;

a piston slidably received in said bore, said piston and said bore forming a fluid chamber therebetween;

said piston having a rear end face and an oil passage connected to the fluid chamber;

a spring biasing said piston in a protruding direction from said bore;

a passage in said housing to connect the fluid chamber with a source of fluid; and a sponge member in said bore, wherein said sponge member retains oil, wherein retraction of said piston causes said sponge member to discharge oil into said oil passage of said piston.

7. The hydraulic tensioner according to claim 1, wherein said oil passage extends axially within the piston from said piston rear end face to an opening at the other end of said piston.

8. The hydraulic tensioner according to claim 7, wherein said oil passage has a relief valve that opens and closes to permit the flow of oil through said oil passage.

* * * * *